United States Patent [19]

Johnson

[11] Patent Number: 5,112,504
[45] Date of Patent: May 12, 1992

[54] SYSTEM AND METHOD OF DECREASING WASTE FLUID IN CONTINUOUS BACKWASH FILTRATION

[75] Inventor: Bruce R. Johnson, Salt Lake City, Utah

[73] Assignee: Baker Hughes Incorporated, Houston, Tex.

[21] Appl. No.: 703,978

[22] Filed: May 22, 1991

[51] Int. Cl.⁵ .................. B01D 24/28; B01D 24/46
[52] U.S. Cl. .................................... 210/792; 210/805; 210/807; 210/808; 210/189; 210/268; 210/279
[58] Field of Search .............. 210/268, 279, 792, 189, 210/269, 795, 794, 275, 675, 676, 677, 678, 786, 788, 805, 807, 808

[56] References Cited

U.S. PATENT DOCUMENTS

| | | | |
|---|---|---|---|
| 3,667,604 | 6/1972 | Lagoutte | 210/268 |
| 3,767,048 | 10/1973 | Prengemann | 210/268 |
| 4,060,484 | 11/1977 | Austin et al. | 210/268 |
| 4,126,546 | 11/1978 | Hjelmner et al. | 210/741 |
| 4,197,201 | 4/1980 | Hjelmner et al. | 210/268 |
| 4,202,770 | 5/1980 | Gappa et al. | 210/268 |
| 4,257,896 | 3/1981 | Ikeda et al. | 210/268 |
| 4,340,485 | 7/1982 | Ikeda et al. | 210/268 |
| 4,592,837 | 6/1986 | Ludwig et al. | 210/268 |
| 4,707,252 | 11/1987 | Durot et al. | 210/188 |
| 4,720,347 | 1/1988 | Berne | 210/792 |
| 4,787,987 | 11/1988 | Hensley | 210/792 |
| 4,826,609 | 5/1989 | Hensley | 210/792 |
| 4,861,472 | 8/1989 | Weiss | 210/268 |
| 5,019,278 | 5/1991 | Jacquet | 210/792 |

FOREIGN PATENT DOCUMENTS 72-8554 3/1972 South Africa.

Primary Examiner—Stanley S. Silverman
Assistant Examiner—Cynthia L. Nessler
Attorney, Agent, or Firm—Skjerven, Morrill, MacPherson, Franklin & Friel

[57] ABSTRACT

A filtering system includes a filter vessel containing a movable granular media bed, a feed stream inlet port for flowing a liquid-solid stream through the bed for filtration, a dirtied media outlet and a cleaned effluent outlet. A vertical cleaning section in either a separate stand-alone washing section vessel or in a washing section within the filter vessle, includes a wash path in which a washing liquid typically a portion of the cleaned effluent washes contaminants from the dirtied media resultant from filtration of the feed stream. The resultant contaminants-containing wash water is pumped to waste but a sidestream thereof is recycled at least in part to the filter vessel to a location in the vessel between the feed stream inlet port and the dirtied media outlet so that the liquid ordinarily transported with the dirty media at the bottom of the filter is replaced, at least in part with the recycle liquid.

17 Claims, 1 Drawing Sheet

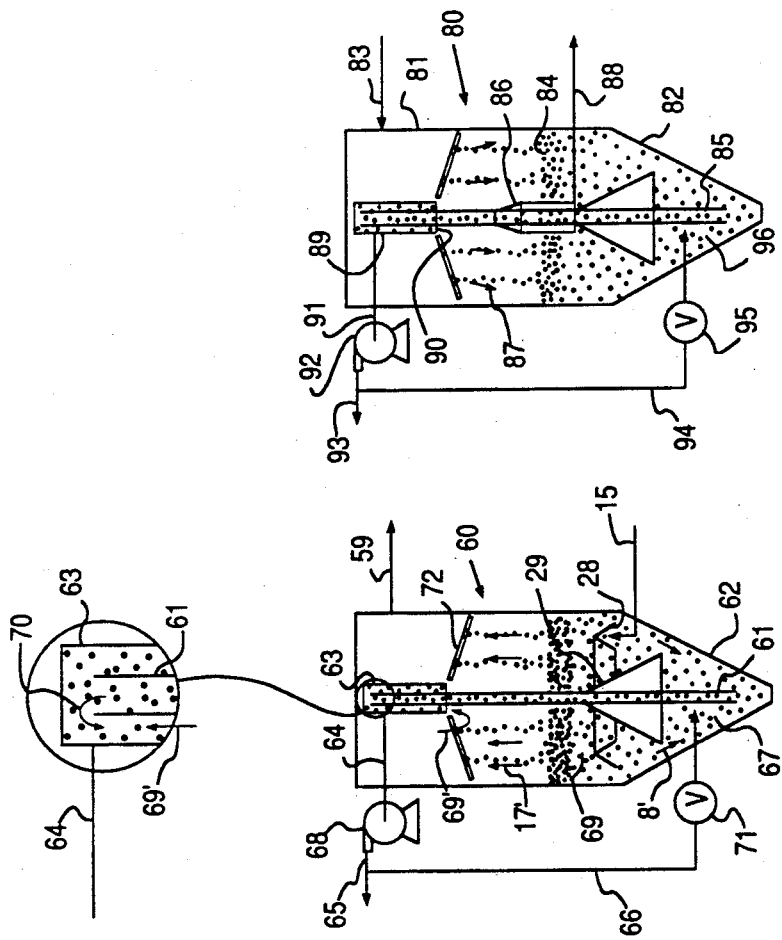
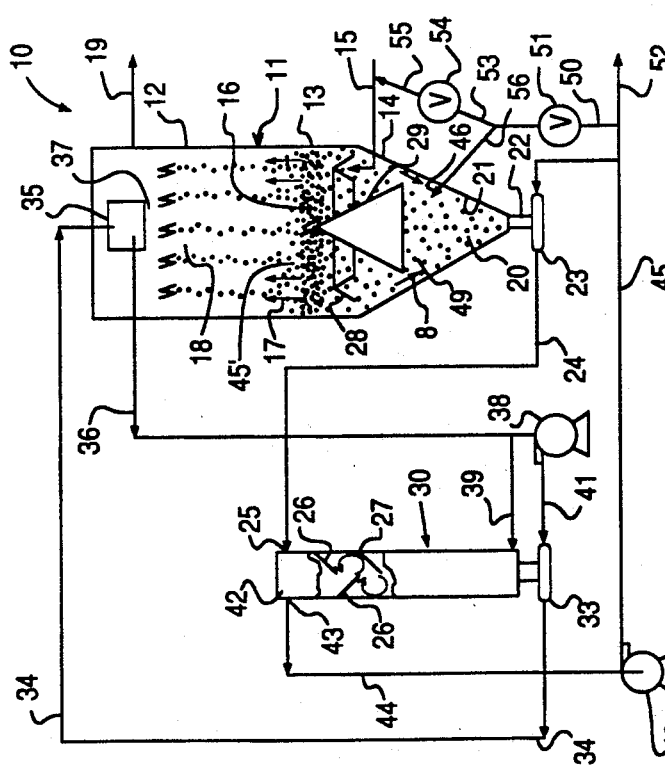
FIG. 1 FIG. 2 FIG. 3

SYSTEM AND METHOD OF DECREASING WASTE FLUID IN CONTINUOUS BACKWASH FILTRATION

RELATED APPLICATION

This application relates to U.S. Ser. No. 07/351,152 filed May 12, 1989 by Sten Jacquet, now U.S. Pat. No. 5,019,278, Granular Media Filter under license by Applicant's assignee. This application also relates to a copending U.S. patent application Ser. No. 07/704031 filed herewith entitled Continuous Backwash Filter and Method of Operation. The disclosures of the above two applications are incorporated herein by reference.

FIELD OF THE INVENTION

This invention pertains to solid-liquid separation. More particularly the invention is directed to an improvement in granular media continuous filter systems and their method of operation.

BACKGROUND OF THE INVENTION

Granular media filter systems have been employed for many decades and generally provide a bed of granular media, such as sand, through which is passed a particulate-containing liquid inlet stream, the particulates being captured by the sand bed with desired clean liquid effluent exiting from the bed. As the bed becomes increasingly loaded with particulates from the solids-liquid inlet stream, a back pressure builds-up and at a desired point it is necessary in these standard filters to stop the filtration cycle and wash the bed. This is normally done by backwashing the bed (U.S. Pat. No. 3,395,099) or fluidizing the bed. Other systems such as that in U.S. Pat. No. 3,512,640 address the problem of cleaning the bed by recycling upflow liquid before it reaches the top of the bed so that it then flows downwardly from the top of the bed. This counteracts the force of the upward flow of the inflowing liquid. Contaminated bed solids are removed from the bed bottom and new media replaced through a valve at the vessel top. Other systems known commercially as the Dynasand system of the Parkson Corporation and the Strata Sand system of Ashbrook-Simon-Hartley Co., are shown in U.S. Pat. Nos. 4,126,546 and 4,060,484, respectively. The former system involves a method and apparatus where a liquid-solids suspension flows in an upward direction through a filter bed and is discharged from the bed top as filtrated liquid phase. During the filtration the filter medium flows downwardly through the bed zone in counter current flow to the upward suspension. Dirtied media at the bed bottom is transported separate from the bed to a wash path within the overall vessel for washing dirty filter media in counter current flow with a wash liquid along the wash path. The washed filter media is then returned to the top of the filter bed zone. In U.S. Pat. 4,246,102 various flocculation chemicals are added to the feed stream directly prior to feed stream entry into the filter bed. In 4,060,484, there is co-flow of the feed liquid with the downwardly moving bed.

In the related application, a suspension up-flow filter vessel is provided with feed being passed into a filter bed in the filter vessel with clean effluent exiting the vessel top. A side stream of cleaned effluent is piped to the bottom of a separate stand-alone washer. This stream generally moves upwardly and by a co-current vortical washing action, washes dirtied filter media transported from the bottom of the filter bed in the filter vessel to the top of the separate washer. The dirtied filter media cascades down baffles in the interior of the washer. The resultant dirtied cleaning stream normally is pumped to waste from the wash vessel top with a side stream thereof used to transport the dirtied filter media from the bottom of the filter vessel to the top of the separate washer. This transport technique is also seen in South Africa Published Application No. 28544 (1972).

One of the problems in the apparatus of the related application and in the methods and apparatus shown in the '546 and '102 patents, is a tendency of part of the feed stream to be pumped to the separate washer along with the dirtied filter media or into the washer column located centrally of the filter vessel in the latter patents. This tends to increase the amount that passes into the waste stream. The prior art methods further have limited flexibility in controlling the headloss in their filter beds.

SUMMARY OF THE INVENTION

The method and apparatus of the invention involves pumping a portion of the waste water produced by a continuous backwashing filter back to the point at which the dirty sand in the filter portion of the system is removed for washing This reduces the amount of water wasted from the filter portion by preventing feed water from being pumped, with the dirty sand, to the washing mechanism. Further, the new method and apparatus provides for controlling the headloss in the filter bed by a method other than controlling the dirty sand pumping rate, therefore adding further flexibility to the operation of a granular media filter. The above improvement in the operational parameters of a continuous backwashing granular media filter is accomplished by pumping at least part of the stream of waste water exiting the media washing section and introducing such stream part at a location in the filter vessel where the dirtied filter media (typically sand) is being removed from the filter bed by the dirtied filter media transport pipe. Part of the recycle stream may also be directed to the feed inlet which further decreases the fluid going to waste.

The major effect of this improvement is to prevent the feed from being pumped to the media washer. This is done by pressurizing the volume surrounding the inlet to the dirty sand pump with water recycled from the top of the sand washer such that a hydraulic barrier is formed substantially preventing, in one mode of operation, entry of portions of the feed stream into the dirty media transport pipe. This volume is pressurized until the pressure at the dirty sand outlet location is equal to or greater than the pressure at the point where the feed is introduced to the media bed. If the pressures are equal, no feed will flow downward, if the pressure is greater at the dirty sand outlet the waste water will be pumped into the bed, further reducing the amount of waste water produced. The pressure at the recycle inlet point can be less than the feed pressure and still give waste water reduction, although not as much as would happen if the pressure at the recycle inlet port is greater.

The secondary effect of this improvement adds more flexibility to the process by creating another method through which the headloss in the media bed may be controlled. This is done by increasing and decreasing the amount of waste water recycled to between the dirty sand outlet and feed inlet. The effect of decreasing the amount of recycle is to reduce the headloss in the filter bed by either reducing the amount of waste water filtered by the media bed (if the pressure is greater at the dirty sand outlet) or to allow a part of the feed to flow downward, therefore removing that portion's solids loading to the filter bed (if the pressure is less). Increasing the amount of recycle would have the opposite effect.

One of the main objectives of a granular media filter is to produce a clean effluent stream. A secondary consideration in all filters is minimizing the amount of water it takes to clean deposited feed contaminants out of the media bed. An advantage of continuous backwashing filters is the production of a constant stream of wash water, rather than the large slug load of wash water that is produced in standard granular media filters. The total amount of wash water used by the two different systems is about similar.

The main advantage of the system disclosed herein is that the waste water produced by a continuous backwashing filter can be reduced significantly and at will without any product decrease or product quality by recycling part of the waste water back to the filtering section at a location adjacent to the dirty media outlet and, in addition if desired, into the feed stream itself. The amount that the waste water amount is reduced can be easily controlled by simply opening and closing one or two valves.

A secondary advantage of the disclosed system and method is allowing additional flexibility in controlling the headloss in the filter bed. Heretofore, the accepted way to control headloss was to change the dirty sand pumping rate. The headloss in the bed, with the present new method and system can be increased or decreased by increasing or decreasing the amount of waste water that is returned to the area between the dirty sand transport pipe inlet and the feed profile area. The invention allows the optimization of granular media filtration in an area that was not previously practical or possible to control, namely in the amount and concentration of the waste water produced in the filtration. This is a significant advantage in that the equipment used to handle the waste water can be decreased in size and cost. The additional flexibility of this method and system in controlling the bed headloss with continuous backwashing filters offers an alternative control that may, in some cases, make the filter a better operating piece of equipment.

Waste flow rates during normal granular media filtration in prior art systems are usually about 5-10% of the total feed rate to the filter, therefore, reducing the product by 5-10%. It is possible to reduce the waste flow, but only at the cost of decreased product quality. The present invention allows reducing the waste stream significantly without any filter product deterioration.

BRIEF DESCRIPTION OF THE DRAWING

FIG. 1 is a schematic diagram of a filtering and dirty media-washing two-vessel system embodying the invention.

FIG. 2. is a schematic diagram of a first filtering and dirty media washing single vessel system embodying the invention.

FIG. 3 is a schematic diagram of a second filtering and dirty media washing single vessel system embodying the invention.

DETAILED DESCRIPTION

The system 10 in FIG. 1 illustrate the general system of the related application with the addition of the present invention. The system 10 includes a granular media bed-containing filtering vessel 11 having a cylindrical upper portion 12 and a conically-shaped bottom portion 14. A feed line 15 permits introduction of a solids-liquid slurry mixture or suspension such as feed water containing metal hydroxides, dirt or biological solids which is introduced into a downwardly moving media bed 16. Profiles 28 and 29, the former in the form of a ring-like cap, function to distribute the feed to prevent channeling. The media bed typically comprises sand particles of from about 0.7 mm to about 2 mm in diameter or along a major axis. The media typically comprises silica sand. Other media options are activated carbon, resin beads, or glass spheres or the like. The solids in the slurry or suspension are filtered out by adhering on to the media particles or by attachment in the interstices between media particles in the bed as the slurry/suspension flows upwardly and the bed particles move downwardly. Cleaned liquid effluent up-flow in vessel 11 is shown by arrows 17 into a top volume 18 in the vessel 11 and exits the vessel 11 through outlet 19 as cleaned effluent.

Dirty media 20 continuously falls from the media bed and is conveyed by the conical or other sloped bottom interior 21 of vessel 11 to a dirty media outlet 22. An eductor 23 or other transport device is connected to outlet 22 which transports the dirty media 20 to the top of a separate media-washing vessel 30 by line 24. The vessel 30 contains a dirty media entry port 25 and a series of internal baffles 26 extending alternately from opposite sides of the vessel 30 interior, as shown in more detail in the related application. The dirty media cascades downwardly from the distal end of each baffle to the baffle immediately below and opposite, eventually arriving at the bottom of vessel 30 where a second eductor 33 transports cleaned/washed media through line 34 to a distributing apparatus 35 such as a hydrocyclone discharging solids to a distributing cone (like perforated cone 72 in FIG. 2) which distributes cleaned media 37 back into the downwardly-moving media bed 16 at bed surface 45'.

Wash water entering hydrocyclone 35 is recycled by line 36 and by line 39 to supply wash water for the dirty media into vessel 30 through line 39 where it rises in a series of vortices 27 so that the wash water is in essentially co-current flow with the downwardly moving cascading media again as shown in detail in the related application. The water outflow from pump 38 is conveyed to the eductor 33 by line 41 to transport the cleaned media particles through line 34 to the distributor apparatus 35. Dirty wash water 42 exits from the top of vessel 30 through outlet 43 and is connected by line 44 to the suction end of pump 48 which pumps the dirty media wash water 42 or waste stream to waste 52 through line 45. The above system describes generally the system disclosed and claimed in the first related application except for the details of the wash water recycle to the media washer.

Since the feed stream 15 enters the media bed at a position approximate the juncture of a cylindrical portion 13 and a conical portion 14 of vessel 11 there is a tendency of some of the feed stream 15 to pass downwardly (arrows 8) with the downwardly moving media and subsequently be pumped with the dirty media 20 by eductor 23 to the top of the washing vessel 30 resulting in the introduction of a portion of the original feed stream into the washing vessel 30 that subsequently must be wasted. This problem is overcome by the present invention by pressuring a bottom volume 49 within vessel 11 surrounding the dirty sand outlet 22 with a sidestream 50 of recycle wash water 42 from the media washer 30 introduced at inlet 46. Sidestream 50 may connected to line 56 and includes a flow control valve 51 such as a Moyno Pinch Valve Model KSR manufactured by Robbins and Meyers of Lumberton, NJ. Volume 49 is pressurized by the recycle wash water entering at inlet 46 thus replacing the downward flowing feed with recycle liquid. If the pressure at the dirty media outlet 22 is equal to or greater than the pressure at the point where the feed stream 15 is introduced into the media bed 16 the entire downward flowing feed stream is replaced by recycle liquid. If the pressures are equal, no part of the feed stream will flow downward. If the pressure is greater at the dirty media outlet 22 the recycled portion of waste water 42 will be pumped into the media bed 16, further reducing the amount of waste water produced which exits by line 52 from the system. If the pressure is less, only a portion of the feed stream will flow downward.

In the alternative, if the hydraulic head is sufficient at the top of the media washer, the portion of the recycle waste water may by gravity flow enter volume 49 to replace any portion of the feed water, which normally would enter the dirty media outlet 22.

Provision may also be made to feed a second portion of the waste stream to the feed inlet 15 or feed stream by providing a line 53 extending either from line 52 or line 45/52, through a flow control valve 54 similar to valve 51 and line 55. This employs more of the waste stream thus reducing the wasted liquid exiting from line 52.

EXAMPLE

In a 91 cm diameter cylindrical vessel with a height of 284 cm having a conical bottom of a height of 121 cm and a 3.5 cm diameter dirty media outlet, a feed stream of about 4.8 cubic meters per hour enters vessel 11. An instantaneous pressure of about 0.65 psi (0.04 atmospheres) results at the feed entrance in the bed. Valve 51 is controlled so that the pressure in volume 49 is in the range of about 0.2 psi to about 0.9 psi, with the outlet pressure and flow rate of pump 48 varying in the range of about 0.05 psi to about 1.5 psi and about 0.05 m³/hr to about 0.5 M³/hr respectively. The ranges represent replacing only part of the feed stream (used if a lower headloss is desired) to actually pumping part of the waste into the filter bed above the profiles. Generally, it is desired to operate the filter bed to maintain a 30 cm to 45 cm H₂O headloss to assure effluent quality.

FIG. 2 schematically illustrates the application of the invention to the system shown in U.S. Pat. No. 4,126,546. The '546 system includes a single vessel 60 having cylindrical and conical sections of various height and diameter. A dirty media washer is provided within vessel 60 in the form of a central tube 61 which transports dirty media from the vessel conical bottom 62 by an airlift arrangement with the dirty media progressing upwardly in the tube to a wash section 63 where it exits the tube to flow into an annulus where the media flows downward in countercurrent flow with wash water provided by a sidestream 69' of clean effluent liquid moving upward in the annulus. Washed media exits the annulus and flows on a conical perforated incline of cone or cap 72 for redistribution onto the top of the media bed. Dirty wash water containing the contaminants washed from the dirty media pass from the annulus surrounding the central pipe 61 into line 64 which thereby flows to waste by gravity. Clean effluent exits from the vessel top through outlet 59. Dirty wash water exits from box 63.

The present invention has utility with the '546 patent system and involves providing a sidestream 66 connected to waste line 65 which sidestream is pumped by pump 68 and is used to transport dirty wash water to a volume 67 surrounding the air lift entrance to pipe 61. The flow in line 66 is controlled by valve 71. Waste water reduction can be achieved even if the recycle water stream only flows by gravity to the area of the dirty sand inlet. If the recycle is pumped much more savings is possible, as well as a better control method. As in FIG. 1 the feed stream entering from feed line 15 is filtered by passing upwardly (arrows 17') through the downwardly-moving media bed 69. The pressurization of volume 67 by the wash water entering the vessel conical bottom 62 through control valve 71 prevents downward flow (arrows 8') of the feed stream into pipe 61 and hence a resultant reduction in waste water.

FIG. 3 illustrates a third embodiment of the invention where a one-vessel system 80 of the U.S. Pat. No. 4,060,484 downflow type includes a cylindrical upper section 81 and a conical bottom section 82. A feed stream 83 enters the upper section 81 and moves downwardly (arrows 87) in co-current flow with the media bed 84 which moves. Dirty filter media is airlifted through central pipe 85 while clean effluent enters into the topside of annulus 86 and exits through clean water line 88. The dirty media exits from the top of pipe 85 and flows downward in annulus 89 countercurrent to a flow of part of the feed stream entering the annulus bottom entrance 90. Dirty wash water containing the contaminants from the dirtied media are flowed by gravity through line 91 to waste 93. In the present improvement a sidestream from the waste line 93 is transported by line 94 by the discharge of pump 92, through a control valve 95 for pressurizing with waste dirty water a volume 96 which surrounds the open bottom end of dirty media upflow pipe 85. This pressurized volume reduces the access of any portion of the feed stream 83 to the interior of pipe 85 thus reducing the eventual waste stream. In each of the embodiments of FIG. 2 and FIG. 3, a second portion of the waste stream may be transported to the feed streams 68 and 83 as illustrated in FIG. 1.

The above description of embodiments of this invention is intended to be illustrative and not limiting. Other embodiments of this invention will be obvious to those skilled in the art in view of the above disclosure.

I claim:

1. A filtering system having a granular media filter including a vertical filter vessel having a media bed, a cleaned effluent outlet, a dirtied media outlet and a feed stream inlet port in said filter vessel;

a vertical media cleaning section including a dirtied media inlet adjacent one end of said cleaning section for receiving dirtied media from said filter bed, a wash liquid inlet adjacent said cleaning section for cleaning the dirtied media, means for returning cleaned media to said media bed, and means for wasting effluent dirtied from cleaning said dirtied media to form a waste stream; and further comprising means for recycling a first portion of the waste stream to a location in said filter vessel below said feed inlet such that said waste stream portion essentially reduces the tendency of a feed stream introduced through said feed stream port from mixing with dirtied media at said dirtied media outlet and from increasing the waste stream.

2. The filtering system of claim 1 in which said media cleaning section is a stand-alone vessel separate from said filter vessel.

3. The filtering system of claim 1 in which said media cleaning section is a tubular vessel within said filter vessel.

4. The filtering system of claim 3 in which said media cleaning tubular vessel includes means for countercurrent flowing dirtied media against a flow of cleaned effluent and means for conveying said first portion of said waste stream from an upper location in said tubular vessel to a location in said filter vessel between said feed stream port and said dirtied media outlet.

5. The filtering system of claim 1 further including means for recycling a second portion of said waste stream to convey dirtied media from said filter vessel to said media cleaning section.

6. The filtering system of claim 1 further including valve means for controlling the headloss in said media bed and waste rate of dirtied wash water by varying the flow rate of said waste stream first portion flowing through the valve means to said filter vessel location.

7. The filtering system of claim 1 wherein said dirty media outlet is at the bottom of the filter vessel and in which said recycling means directs flow of said first portion of the waste stream to a location adjacent to the bottom of said filter vessel intermediately between an upper location of said feed stream port and said dirtied media outlet.

8. The filtering system of claim 1 wherein said cleaned effluent outlet is adjacent to the filter vessel top; said dirtied media outlet is adjacent to the filter vessel bottom and said feed stream port is intermediate said cleaned effluent outlets and said dirtied media outlet.

9. The filtering system of claim 8 wherein said cleaning vessel is a stand-alone vessel for receiving dirtied media from said filter vessel and wherein a portion of said waste stream transports said dirtied media to said cleaning vessel.

10. The filtering system of claim 1 further including means for recycling a second portion of said waste stream to said feed stream.

11. In a method for filtering a liquid-solids feed stream supplied through a feed inlet to a filter media bed in a vessel, the stream flowing, during the filtration thereof, through said bed and being discharged from the media bed as cleaned effluent, and wherein the filter media of the filter bed during filtration flows downwardly and is transported from the filter media bed through a dirtied media outlet in the vessel to a washing section for separating contaminants from the dirtied filter media and wherein the cleaned filter media is returned to a top surface of the filter bed and a contaminants-containing washing fluid is transported as a waste stream to waste, the improvement comprising recycling a portion of the waste stream to a location in said vessel between said dirtied media outlet and said feed inlet.

12. The method of claim 11 further comprising recycling a second portion of said waste stream juxtaposed to said dirtied media outlet to transport the dirtied media to said washing section.

13. The method of claim 12 in which said second portion of said waste stream transports dirtied media from said dirtied media outlet to said washing section.

14. The method of claim 11 in which the dirtied media is air lifted to said washing section.

15. The method of claim 11 further comprising controlling the pressure of said recycled portion of the waste stream at the vessel location such that flow of the feed stream is prevented at least in part from reaching the dirtied media outlet.

16. The method of claim 15 further comprising replacing at least in part downward flowing feed liquid with said waste stream portion surrounding said dirtied media outlet.

17. The method of claim 11 further comprising recycling a second portion of said waste stream to said feed stream.

* * * * *